United States Patent [19]
Blankenship

[11] Patent Number: 5,299,528
[45] Date of Patent: Apr. 5, 1994

[54] RAPTOR PROTECTION UNIT FOR USE ON A POWER POLE

[76] Inventor: Buck M. Blankenship, 3127 E. 3200 N., Twin Falls, Id. 83301

[21] Appl. No.: 49,166

[22] Filed: Apr. 19, 1993

[51] Int. Cl.5 ............... A01K 45/00; A01K 31/12
[52] U.S. Cl. .................................. 119/26; 52/101
[58] Field of Search ............... 119/26, 903; 52/101

[56] References Cited

U.S. PATENT DOCUMENTS

| | | | |
|---|---|---|---|
| 1,685,663 | 9/1928 | Austin | 119/903 X |
| 2,045,395 | 6/1936 | Leindorf | 119/26 |
| 4,359,844 | 11/1982 | Hoggard et al. | 52/101 |
| 5,092,088 | 3/1992 | Way | 52/101 |

FOREIGN PATENT DOCUMENTS 1418455  8/1988  U.S.S.R. ............... 52/101

Primary Examiner—Robert P. Swiatek
Attorney, Agent, or Firm—Frank J. Dykas; Craig M. Korfanta; Ken J. Pedersen

[57] ABSTRACT

Various embodiments of a raptor protection unit for installation on a power pole crossbar are shown and described, each having a clamp system secure enough to hold a perch on the crossbar. Each embodiment includes two side-lock clamps, which each have a stationary C-shaped brace, for bracing against the top, a side, and the bottom of the crossbar, and an L-shaped side-lock, for exerting pressure on the opposing side of the crossbar. The two side-lock clamps may face the same direction or opposite directions. For embodiments with same-direction side-lock clamps, an optional bottom-lock clamp may be placed between the side-lock clamps, for exerting pressure on the bottom of the crossbar. The raptor protection unit includes a perch and/or a roost guard.

14 Claims, 8 Drawing Sheets

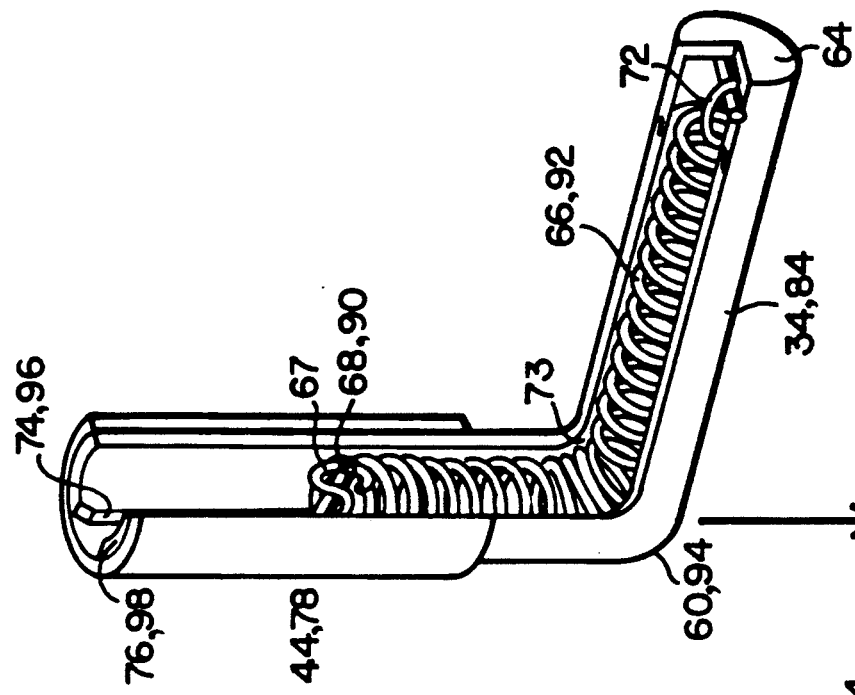
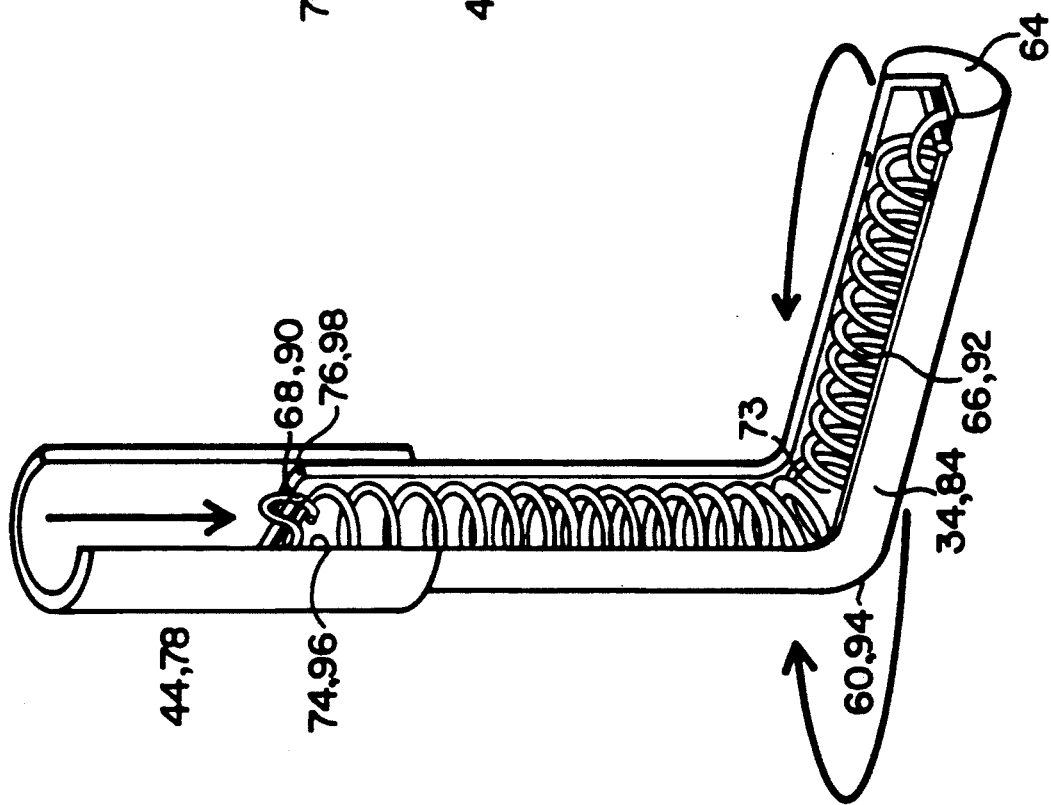

RAPTOR PROTECTION UNIT FOR USE ON A POWER POLE

BACKGROUND OF THE INVENTION

1. Technical Field

This invention relates generally to perches and guards for birds of prey on electrical power lines. More specifically, it relates to a convenient, but secure, clamp for attaching such perches and guards to electrical power line poles.

2. Background Art

Presently, birds of prey, or raptors, are vulnerable to shock and electrocution from electrical power lines. When the big birds land on electrical power line poles, they prefer the space on the pole crossbar between two parallel power lines. When they take off, however, they jump off the crossbar between the two lines, and, with the first downstroke of their wings, often touch both lines, causing a short circuit and electrocuting themselves. This phenomenon has resulted in the death of many such birds, and the interruption of electrical service to many utility customers.

Pacer Industries of Twin Falls, Idaho, produces a raptor guard for installation on power line pole crossbars. Pacer's guard is depicted in FIG. 1. The clamp system for this guard has two stationary L-shaped members which are on the same side, opposite a pair of inverted F-shaped members. Each inverted F-shaped member has a stationary portion, which is connected to one of the stationary L-shaped members, and a movable portion, which extends under the bottom side of the power pole crossbar. A straight coiled spring extends through the spine of the inverted F-shaped member to connect the stationary portion and the movable portion.

The Pacer clamp works reasonably well for attaching raptor guards. A guard is a device devoid of horizontal outside edges, which is attached to the pole crossbars. The outside edges may be vertical or steeply angled downwardly or upwardly, as depicted in FIG. 1. These nonhorizontal edges discourage the big birds from landing on the space protected by the guard.

There is a need, however, to provide safe perches for the raptors, as well as guards. The strategy is to encourage the birds to land where they will be safe, and to discourage them from landing where they may be hurt. A raptor protection unit of my design and including a perch is depicted in FIG. 2. For perches, the crossbar clamp must withstand great forces exerted by the big birds during landings and takeoffs. The Pacer clamp described above, designed for guards which needn't withstand the weight of the birds, will not hold up well for perch service. In particular, a twisting, rocking or lifting action exerted on the Pacer clamp by the big birds will often knock it loose from the crossbar, creating a risk for the bird and the electrical service.

There is a need then, for a raptor perch clamp which may be conveniently, but securely, attached to a power line pole crossbar. Also, there is a need for a raptor perch clamp which can repeatedly withstand the great forces of the big birds landing on it and taking off from it.

DISCLOSURE OF INVENTION

I have invented a raptor protection unit with a convenient, secure clamp system especially for use with a perch. My clamp system uses side-lock clamps, which, from a side view, each have a moveable L-shaped side-lock that cooperatively engages a stationary C-shaped brace. The L-shaped side-lock engages the C-shaped brace in a manner that allows the L-shaped side-lock to side toward and away from the brace and to allow the vertical leg of the side-lock to swing up and away from the brace. A cocking means temporarily holds the side-lock in a pulled-out and swung-away position while the crossbar of a power pole is inserted into the C-shaped brace. The side-lock clamp also comprises a locking means for securing the clamp around the crossbar after the crossbar is inserted. The locking means includes a biasing means for pulling the L-shaped side-lock toward the crossbar and a latch means for keeping the vertical leg of the L-shaped side-lock pointing down along a side of the crossbar.

The raptor protection unit may include a perch and/or a roost guard, attached to the side-lock clamps. The perch provides the raptor a safe place on which to rest and from which to take off into flight. The roost guard prevents the raptor from perching on the crossbar and taking off into flight too close to the power lines.

My invention may include two side-lock clamps facing the same direction, or two side-lock clamps facing opposite directions, or two side-lock clamps facing the same direction with a bottom-lock clamp between them.

The invented clamp system allows a raptor perch to be securely and conveniently installed on a power pole and allows it to withstand the forces exerted by a raptor's landings and take-offs, especially the twisting, rocking, and lifting forces that can knock loose the prior art clamps that have only moveable members under the bottom of the crossbar. Each invented side-lock clamp provides stationary bracing on the top, a side, and bottom of the crossbar and applies force on the opposing side of the crossbar. In embodiments with two opposing side-lock clamps, the C-shaped braces provide stationary bracing on top, bottom, and both sides of the crossbar and the L-shaped side-locks apply force on both sides of the crossbar. In embodiments including two side-lock clamps and a bottom-lock clamp, the C-shaped braces provide stationary bracing at two locations along the crossbar on top, on one side, and on the bottom of the crossbar, the L-shaped side-locks apply force on the opposing side at two locations, and the bottom lock clamp applies force on the bottom of the crossbar in between the side-lock clamps.

All metal components of the clamp system are internal, which prevents the raptor protection unit from becoming a conductor of electricity.

BRIEF DESCRIPTION OF THE DRAWINGS

FIG. 8A is a perspective view of a cutaway of an L-shaped side-lock or an L-shaped bottom-lock, in released position.

FIG. 8B is a perspective view of a cutaway of the L-shaped side-lock or L-shaped bottom-lock pulled out and ready for rotation to go into the cocked position.

BEST MODE FOR CARRYING OUT INVENTION

Figure 3:
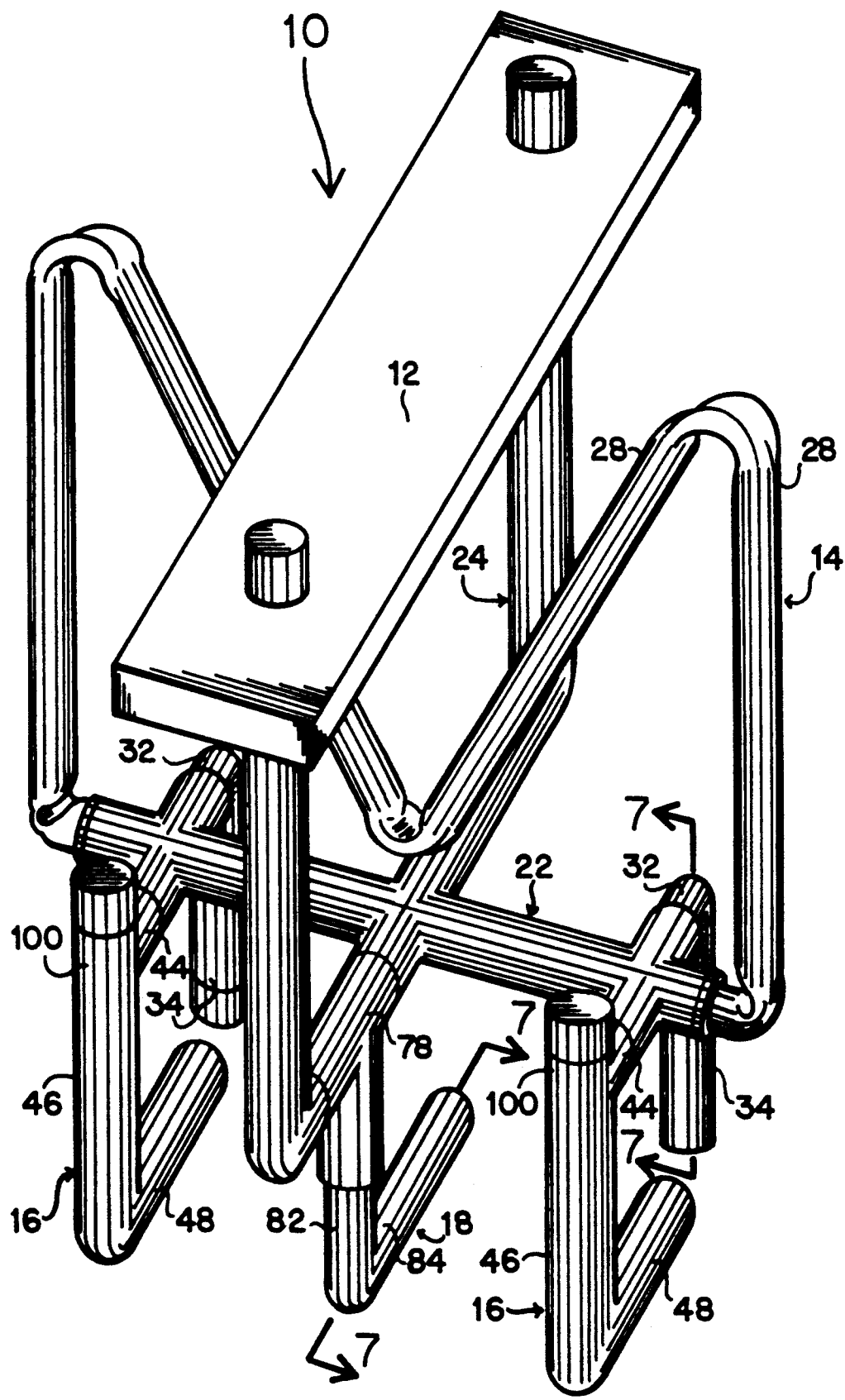
FIG. 3 is a perspective view of one embodiment of the invented raptor protection unit, having two side-lock clamps and a bottom-lock clamp, a perch, and a roost guard.

Referring to FIGS. 2-8B, there are shown several, but not the only, embodiments of the invented raptor protection unit 10. The preferred embodiment is shown in FIG. 3 and includes a perch 12, a roost guard 14, and a clamp system that includes two side-lock clamps 16 and a bottom-lock clamp 18 in between the side-lock clamps 16. An attachment means connects the perch 12 to the side-lock clamps 16 and, in the preferred embodiment, includes a horizontal bar 22 that connects together the side-lock clamps 16 and a U-shaped bar 24 that extends up from the horizontal bar 22 to hold the perch 12.

The perch 12 is preferably, but not necessarily, at a 90° angle to the crossbar 26, to encourage the raptor to take off away from and perpendicular to the power lines, and about 15-24 inches above the crossbar 26. Alternatively, the perch 12 may be a greater distance above the crossbar 26 or a distance to one side of the side-clamps 16 to distance the raptor from the power lines 27.

Figure 1:
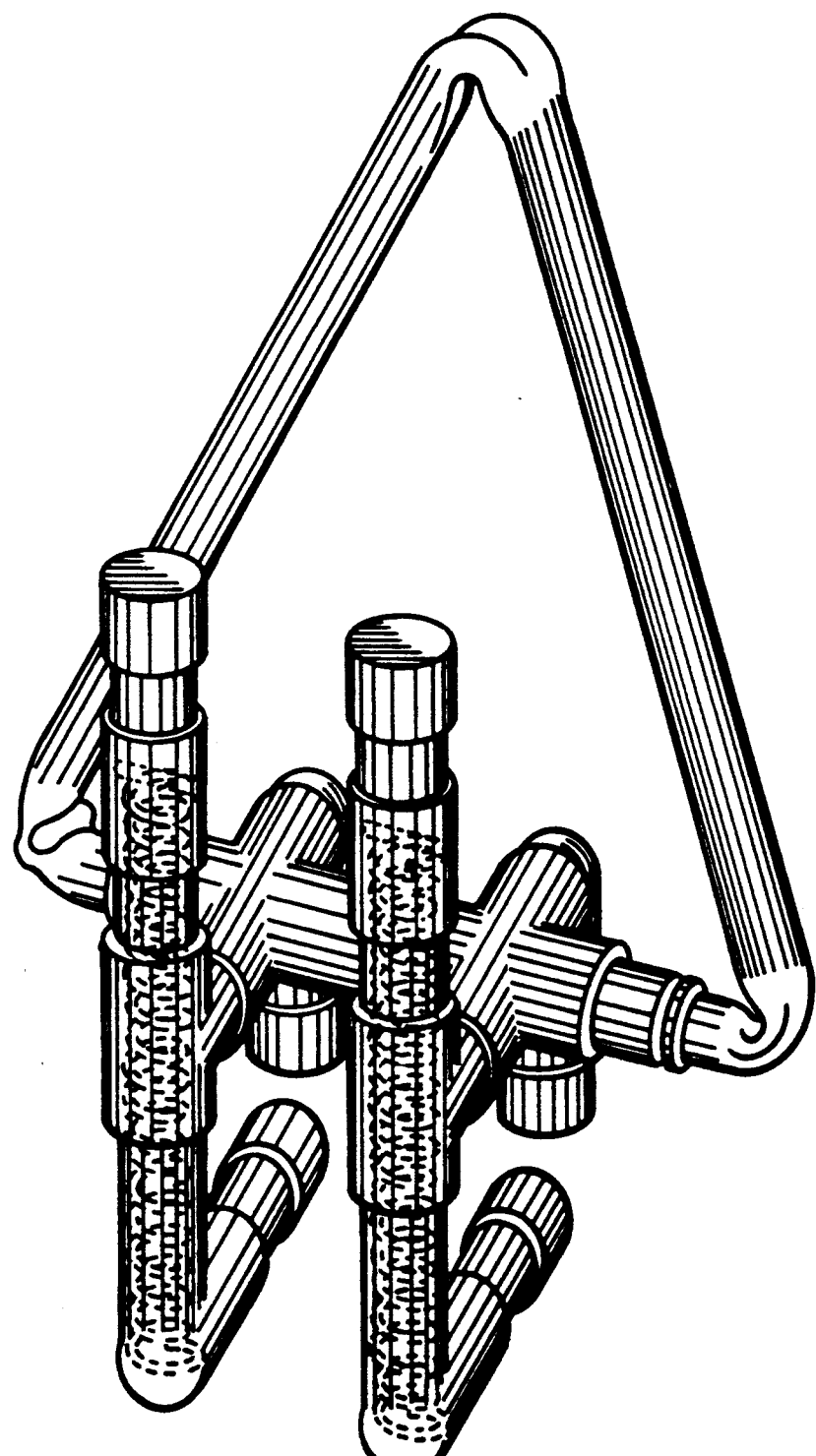
FIG. 1 is a perspective view of a Pacer Industries raptor guard, which is prior art related to the invention.
Figure 2:
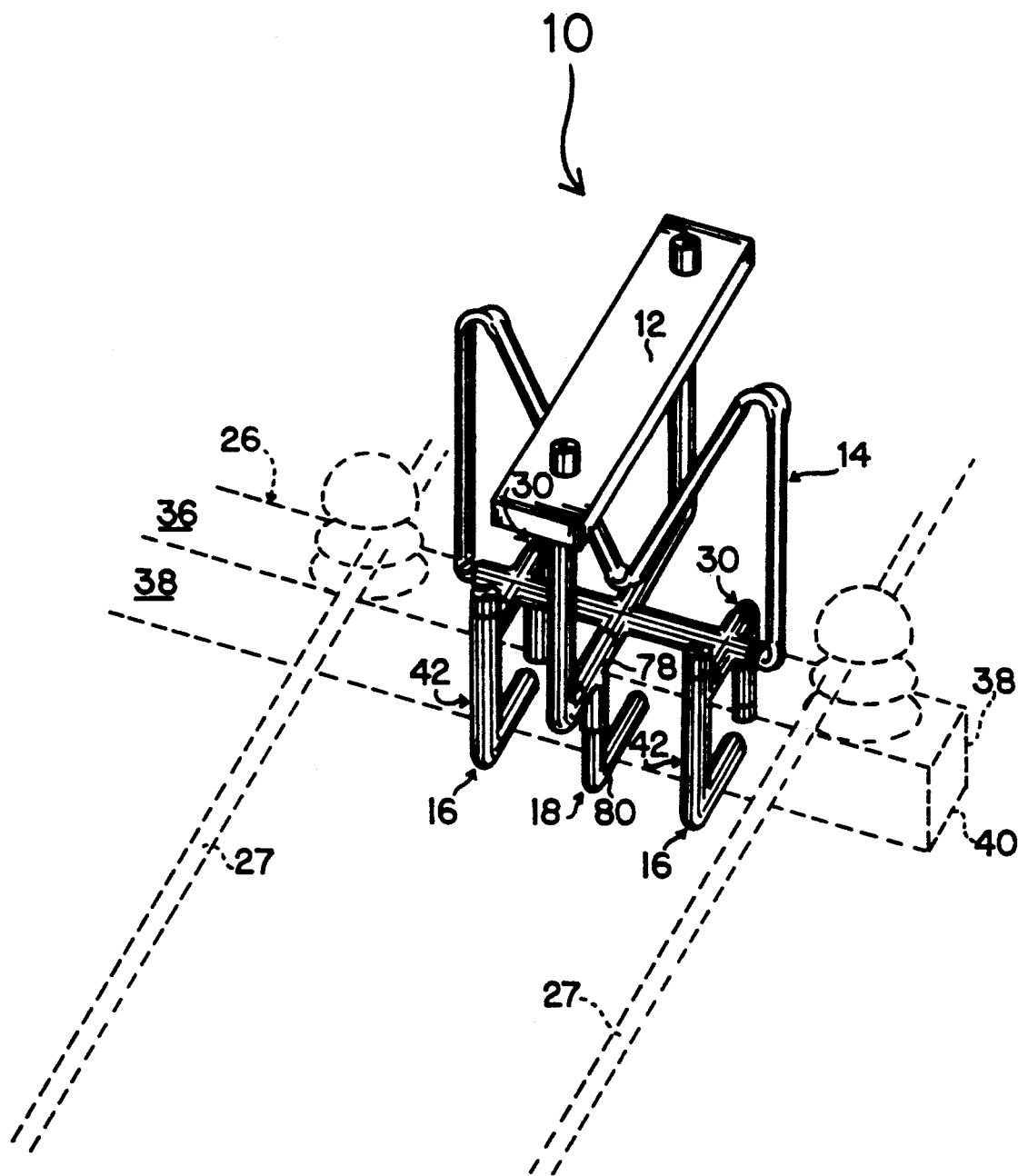
FIG. 2 is a perspective view of one embodiment of the invented raptor protection unit installed on a power pole crossbar.

The roost guard 14 is connected to the side-lock clamps 16 either directly or by means of being attached to the perch attachment means or to the perch 12. The roost guard 14 may be of various designs, such as the M-shape shown in FIG. 3, or a triangular shape such as used in the prior art in FIG. 1. All roost guard 14 designs should have generally vertical outside edges 28, which discourage raptors from landing on the roost guard 14. The position of the roost guard 14 above the crossbar 26 and the lack of horizontal landing places on the roost guard 14 tend to keep the raptor off the crossbar 26 and away from the space above and along the crossbar 26 that is protected by the roost guard 14.

The raptor protection unit 10 may include both a perch 12 and a roost guard 14, as in the preferred embodiment, in order to provide a safe and desirable resting place for the large birds. Optionally, the raptor protection unit may include only a perch or only a roost guard.

The invented clamp system provides a way to securely and conveniently attach the raptor protection unit 10 to the power pole crossbar 26, which is especially important if the unit is to include a perch 12. In the preferred embodiment of FIG. 2, the clamp system has two side-lock clamps 16 and a bottom-lock clamp 18. In an alternative embodiment shown in FIG. 5, the clamp system has two side-lock clamps 16 that face opposite directions. In an alternative, third embodiment shown in FIG. 6, the clamp system has two side-lock clamps 16 facing the same direction.

Each side-lock clamp 16 includes a movable, L-shaped side-lock 30 with a horizontal leg 32 and a vertical leg 34, for extending across the top 36 and down a side 38 of the crossbar 26. Each side-lock clamp 16 also includes a stationary C-shaped brace 42 with a top leg 44, a side portion 46, and a bottom leg 48 for extending across the top 36, down a side 38, and in across the bottom 40 of the crossbar 26. The C-shaped brace 42 and the L-shaped side-lock 30 oppose each other and so the side portion 46 and the vertical leg 34 extend down opposite sides of the crossbar 26.

Figure 4:
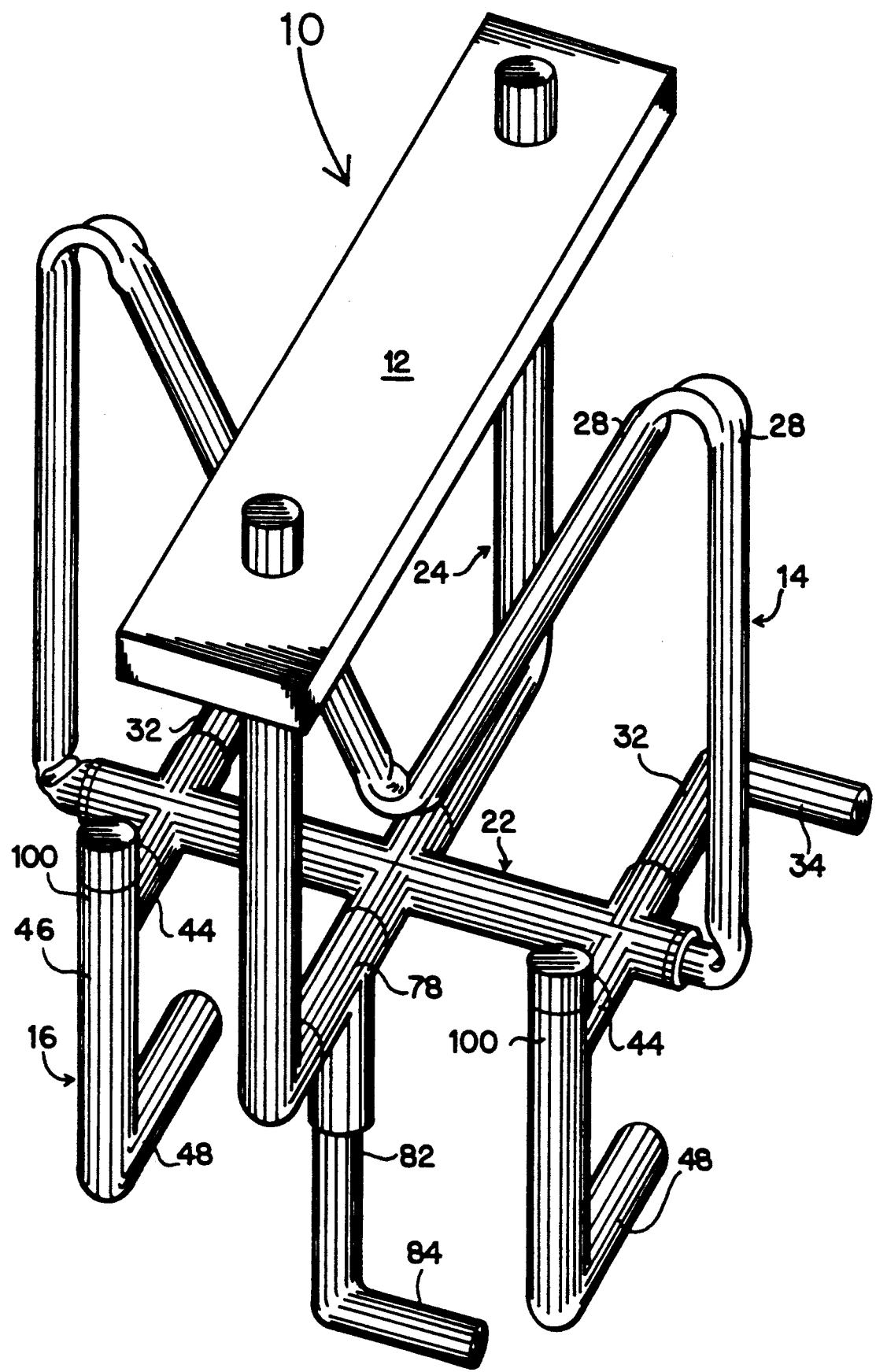
FIG. 4 is a is a perspective view of the embodiment in FIG. 3, shown with the L-shaped side-locks and the L-shaped bottom-lock cocked in preparation for installation on a power pole crossbar.
Figure 5:
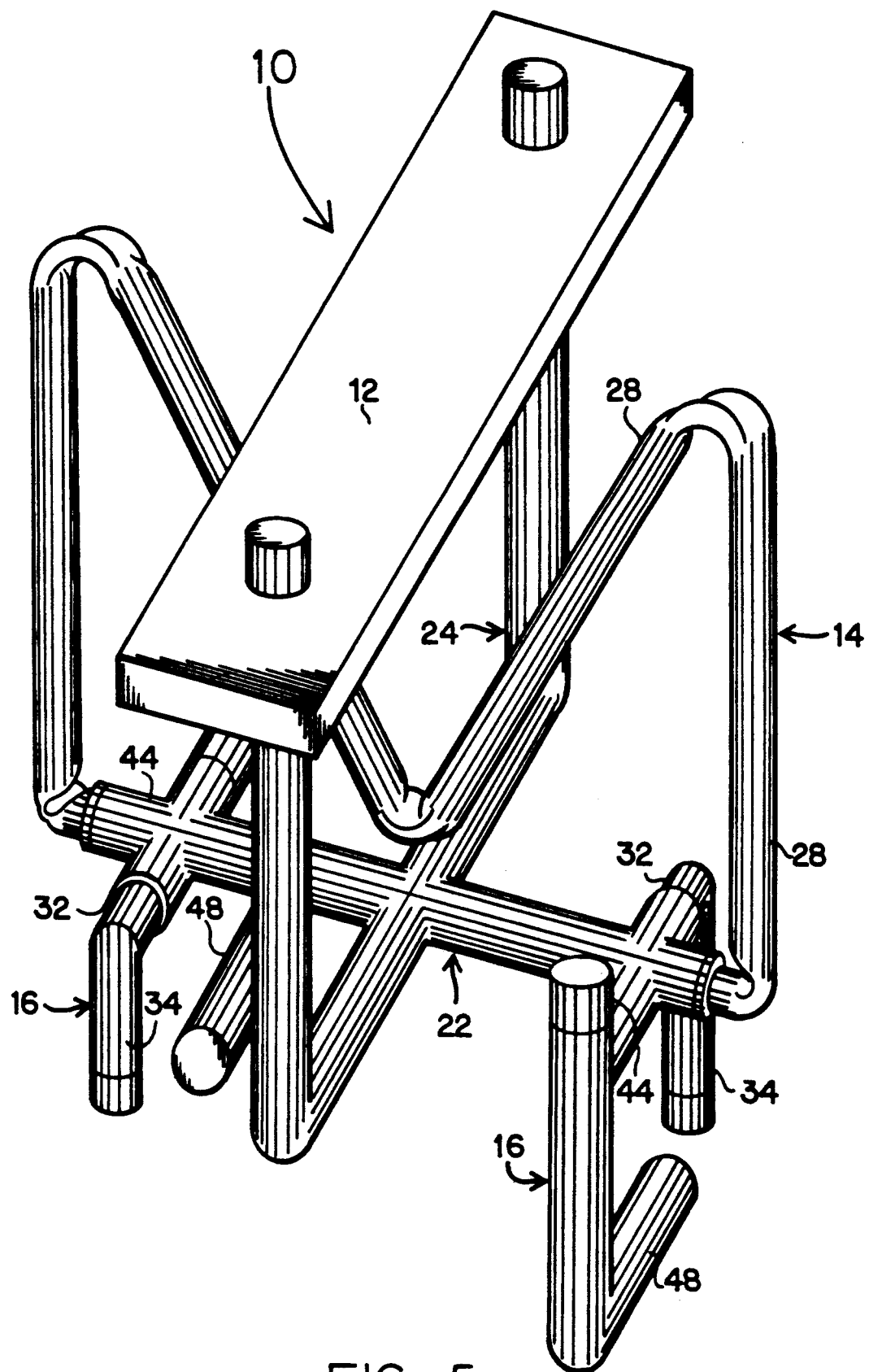
FIG. 5 is a perspective view of another embodiment of the invention, with two side-lock clamps facing the opposite direction.
Figure 6:
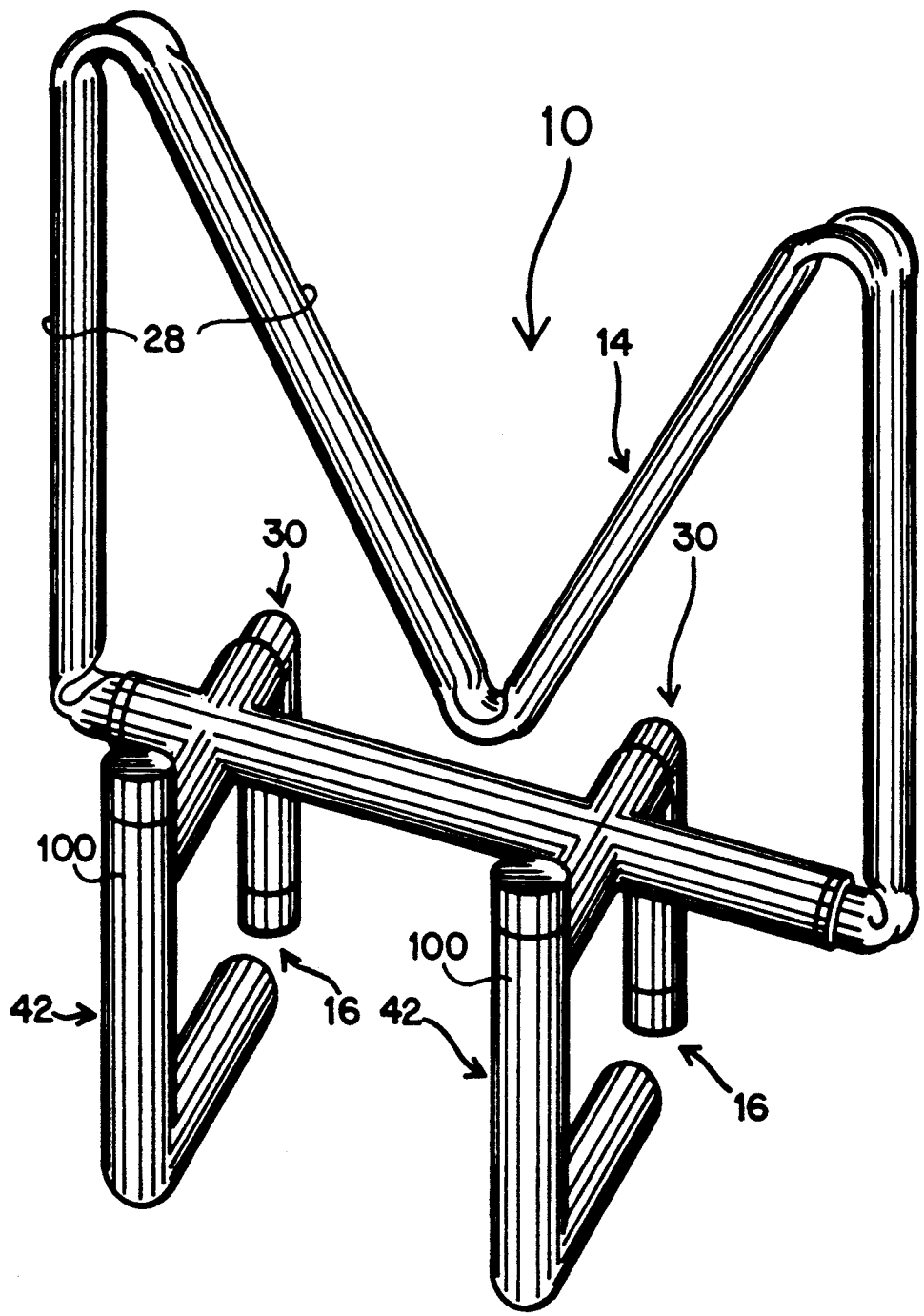
FIG. 6 is a perspective view of another embodiment of the invention with two side-lock clamps facing the same direction.

The L-shaped side-lock 30 is slidably and rotatably connected to and cooperates with the top leg 44 of the C-shaped brace 42, so that the L-shaped side-lock 30 may be slid out or pulled away from the C-shaped brace 42 and rotated upward or swung away from the C-shaped brace 42, so that the vertical leg 34 swings away from the bottom leg 48 of the C-shaped brace 42. A cocking means holds the L-shaped side-lock 30 in the pulled-out and swung-away position, which is illustrated in FIG. 4, to keep it out of the way so the crossbar 26 can be inserted into the C-shaped brace 42 in between the top leg 44 and the bottom leg 48. Once the crossbar 26 has been inserted, or in other words the C-shaped brace 42 has been placed around the crossbar 26, the cocking means is released and the L-shaped side-lock 30 is swung down and pulled back toward the crossbar 26. A locking means serves to lock the side-lock clamp 16 around the crossbar 26 to secure the raptor protection unit 10 onto the crossbar 26. The locking means includes a biasing means, which pulls or forces the L-shaped side-lock 30 in toward the C-shaped brace 42 and against the side 38 of the crossbar 26, and a latch means, which holds the vertical leg 34 down along the side 38 of the crossbar 26.

Figure 7:
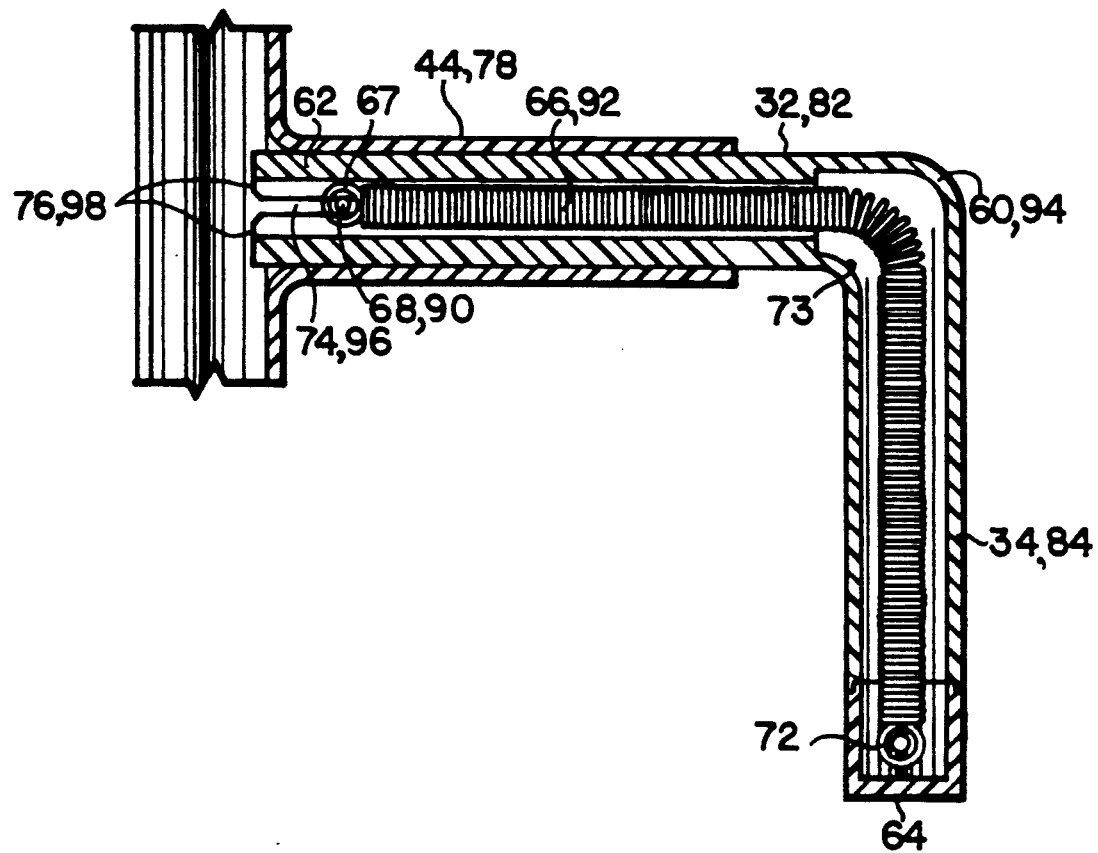
FIG. 7 is a cross-sectional view of an L-shaped side-lock or a L-shaped bottom-lock, viewed along the lines 7—7 in FIG. 3.

In the preferred embodiment, the L-shaped side-lock 30 is a hollow tube, with a first tube end 62, a second tube end 64, and an approximately 90 degree bend 60, as shown in FIGS. 7 and 8. The top leg 44 of the C-shaped brace 42 is also hollow. A common screen door spring 66 is attached at one end 67 to a rolled steel pin 68, which is anchored in the top leg 44 and extends across the top leg hollow interior. The first tube end 62 slips inside the top leg hollow interior and the spring 66 extends into the hollow tube 58 through the horizontal leg 32, past the 90° bend 60, and through the vertical leg 34 to be anchored at a second end 72 to the vertical leg 34. The spring 66 acts as the biasing means, by pulling the L-shaped side-lock 30 toward the top leg 44. Designing the spring 66 to extend past the 90° bend 60 to extend into the vertical leg 34 allows for use of a long spring while keeping the clamp parts short and simple. Preferably, the inside elbow surface 73 is smooth in order to prevent the spring 66 from binding.

Two long notches 74 are cut in the first tube end 62. These long notches 74 receive the rolled steel pin 68 when the L-shaped side-lock 30 is pulled in toward the C-shaped brace 42. When the L-shaped side-lock 30 is pulled out and rotated approximately 90° to be in the pulled-out and swung-away position, the end surfaces 76 of the first tube end 62 abut on the pin 68 and keep the L-shaped side-lock 30 from being pulled back into the top leg 44 by the spring 66. Thus, the cooperation between the pin 68, the end surfaces 76, and the spring 66 acts as the cocking means. To release the cocking means in this embodiment, the vertical leg 34 is swung down approximately 90°, which again aligns the long notches 74 with the pin 68 so that the spring 66 can again pull the horizontal leg 32 into the top leg 44.

The cooperation of the pin 68 and the long notches 74 also acts as the latch means. When the L-shaped side-lock 30 is in the pulled-in position, the long notches 74 receive the pin 68 and prevent the L-shaped side-lock 30 from being rotated, thus keeping the vertical leg 34 in a pointing-down position along a side 38 of the crossbar 26.

The bottom-lock clamp 18 in the preferred embodiment has a top brace 78, for extending across the top 36 and down a side 38 of the crossbar 26, and an L-shaped bottom-lock 80 having a vertical portion 82 and a horizontal portion 84, for extending down the side 38 and across the bottom 40 of the crossbar 26. The L-shaped bottom-lock 80 is slidably attached to the top brace 78 so that it may be pulled down and held in place by a cocking means to allow insertion of the crossbar 26 into the top brace 78. When the cocking means is released, a biasing means pulls the L-shaped bottom-lock 80 up toward the top brace 78 to force the horizontal portion 84 against the bottom 40 of the crossbar 26. In the preferred embodiment, the L-shaped bottom-lock 80 and the top brace 78 are hollow and cooperate with a pin 90 and spring 92 in a manner similar to the L-shaped side-lock 30 and the C-shaped brace 42. The spring 92 acts as the biasing means, and extends past the 90° bend 94 in the L-shaped bottom-lock 80. The spring 92, pin 90, long notches 96, and end surfaces 98 cooperate, similarly to those of the side-lock clamp 16, to act as the cocking means for the bottom-lock clamp 18. The bottom-lock clamp 18 cocking means involves rotation of the L-shaped bottom-lock 80, as well as holding it in a pulled-down position. Alternatively, a cocking means that holds the L-shaped bottom-lock 80 down but not rotated would also work in this embodiment to hold the horizontal portion 84 out of the way for insertion of the crossbar 26. The details of both the L-shaped bottom-lock 80 and L-shaped side-lock 30 are pointed out and numbered on the same drawings, FIGS. 7 and 8, due to their similarity.

The invented raptor protection unit 10 may be installed on a crossbar 26 by use of a hand-held extension arm, similar to those used to retrieve merchandise from high shelves in stores or warehouses, so that the installer need not climb up the power pole. The L-shaped side-locks 30, and L-shaped bottom-locks 80 if present, are cocked and then the raptor protection unit 10 is lifted up and placed onto the crossbar 26 by use of the extension arm. Then, the extension arm is used to swing the vertical legs 34, and horizontal portion 84 if present, to release the cocking means. The springs 66, 92 pull the L-shaped side-locks 30 and L-shaped bottom-locks 80 against the cross bar 26 and the raptor protection unit 10 is thus securely clamped onto the crossbar 26. The embodiment with opposing side-lock clamps 16 is installed similarly to the other embodiments, except that it is placed on the crossbar 26 at 90° to the crossbar 26 and then rotated so that the crossbar slides into the opposing C-shaped braces 42.

The raptor protection unit 10 may be made of PVC piping and elbows or other weather- and sun-resistant material.

The extensions 100 above the C-shaped braces 42 shown in FIGS. 2–6 are present because of the convenience of using capped PVC T-shaped members in the construction of the PVC piping embodiment, but are not required for structural or operational reasons.

While there is shown and described the present preferred embodiment of the invention, it is to be distinctly understood that this invention is not limited thereto but may be variously embodied to practice within the scope of the following claims.

I claim:

1. A raptor protection unit, for installation on a power-line pole crossbar having a top surface, a bottom surface, and two opposing side surfaces, the raptor protection unit comprising:

two side-lock clamps for being clamped around the crossbar to secure the raptor protection unit onto the crossbar, each side-lock clamp comprising:

a C-shaped brace for receiving the crossbar, having a top leg for extending across the top surface of the crossbar, a side portion for extending down along a side surface of the crossbar, and a bottom leg for extending across the bottom surface of the crossbar, an L-shaped side-lock, opposing the C-shaped brace, having a horizontal leg for extending across the top surface of the crossbar and a vertical leg for extending down along a side surface of the crossbar, the horizontal leg being slidably and rotatably connected to the top leg of the C-shaped brace, so that the L-shaped side-lock may be pulled out to distance the vertical leg from the C-shaped brace and may be rotated to swing the vertical leg away from the bottom leg of the C-shaped brace for allowing insertion and removal of the crossbar into and out of the C-shaped brace, a cocking means for temporarily holding the L-shaped side-lock in the pulled-out and swung-away position, and a lock means for holding the vertical leg of the L-shaped side-lock against the crossbar to secure the side-lock clamp around the crossbar, the lock means comprising:

a biasing means for pulling the L-shaped side-lock toward the C-shaped brace to force the vertical leg against the side surface of the crossbar, and a latch means for holding the vertical leg of the L-shaped side-lock down along the second side surface of the crossbar, a horizontal perch for being located at a distance from the crossbar for providing a raptor a place to alight and roost that is a distance from the crossbar and power lines, and an attachment means for connecting the perch to the side-lock clamps.

2. A raptor protection unit as set forth in claim 1, further comprising a roost guard attached to the side-lock clamps, for extending above and along the crossbar between the power lines for discouraging raptors from alighting and roosting on the crossbar between the power lines, and the roost guard having vertical outside edges for discouraging raptors from alighting and roosting on the roost guard.

3. A raptor protection unit as set forth in claim 2, wherein the horizontal perch is perpendicular to the crossbar, for encouraging the raptor to take off into flight in a direction perpendicular to and away from the power lines.

4. A raptor protection unit as set forth in claim 2, wherein the two side-lock clamps face the same direction, and further comprising a bottom-lock clamp for receiving the crossbar and securing the raptor protection unit onto the crossbar, the bottom-lock clamp comprising:

a top brace attached to and in between the two side-lock clamps, for extending along the top surface and down along the side surface of the crossbar on the same side as the C-shaped braces, an L-shaped bottom-lock having a vertical portion, for extending from the top brace toward the bottom surface of the crossbar, and a horizontal portion for extending across the bottom surface of the crossbar, the vertical portion being slidably attached to the top brace so that the L-shaped bottom-lock may be pulled down to distance the L-shaped bottom-lock from the top brace for allowing insertion and removal of the crossbar into and out of the bottom-lock clamp, a cocking means for temporarily holding the L-shaped bottom-lock in the pulled-down position, and a biasing means for pulling the L-shaped bottom-lock toward the top brace to force the horizontal portion against the bottom surface of the crossbar for securing the crossbar into the bottom-lock clamp.

5. A raptor protection unit as set forth in claim 4, wherein the L-shaped bottom-lock is a hollow tube having a 90° turn and wherein the biasing means comprises a coiled spring attached at one end to the top brace and extending through the interior of the hollow tube through the vertical portion, past the 90° turn, and into the horizontal portion and attached to the other end to the horizontal portion.

6. A raptor protection unit as set forth in claim 2, wherein the L-shaped side-lock is a hollow tube having a 90° turn and wherein the biasing means comprises a coiled spring attached at one end to the C-shaped brace and extending through the interior of the hollow tube through the horizontal leg, past the 90° turn, and into the vertical leg and attached at the other end to the vertical leg.

7. A raptor protection unit as set forth in claim 1, wherein the horizontal perch is perpendicular to the crossbar, for encouraging the raptor to take off into flight in a direction perpendicular to and away from the power lines.

8. A raptor protection unit as set forth in claim 1, wherein the two side-lock clamps face the same direction, and further comprising a bottom-lock clamp for receiving the crossbar and securing the raptor protection unit onto the crossbar, the bottom-lock clamp comprising:

a top brace attached to and in between the two side-lock clamps, for extending across the top surface and down along the side surface of the crossbar on the same side as the C-shaped braces, an L-shaped bottom-lock having a vertical portion, for extending from the top brace toward the bottom surface of the crossbar, and a horizontal portion for extending across the bottom surface of the crossbar, the vertical portion being slidably attached to the top brace so that the L-shaped bottom-lock may be pulled down to distance the L-shaped bottom-lock from the top brace for allowing insertion and removal of the crossbar into and out of the bottom-lock clamp, a cocking means for temporarily holding the L-shaped bottom-lock in the pulled-down position, and a biasing means for pulling the L-shaped bottom-lock toward the top brace to force the horizontal portion against the bottom surface of the crossbar for securing the crossbar into the bottom-lock clamp.

9. A raptor protection unit as set forth in claim 8, wherein the L-shaped bottom-lock is a hollow tube having a 90° turn and wherein the biasing means comprises a coiled spring attached at one end to the top brace and extending through the interior of the hollow tube through the vertical portion, pas the 90° turn, and into the horizontal portion and attached at the other end to the horizontal portion.

10. A raptor protection unit as set forth in claim 1, wherein the L-shaped side-lock is a hollow tube having a 90° turn and wherein the biasing means comprises a coiled spring attached at one end to the C-shaped brace and extending through the interior of the hollow tube through the horizontal leg, past the 90° turn, and into the vertical leg and attached at the other end to the vertical leg.

11. A raptor protection unit, for installation on a power-line pole crossbar having a top surface, a bottom surface, and two opposing side surfaces, the raptor protection unit comprising:

two side-lock clamps for being clamped around the crossbar to secure the raptor protection unit onto the crossbar, each side-lock clamp comprising:

a C-shaped brace for receiving the crossbar, having a top leg for extending across the top surface of the crossbar, a side portion for extending down along a side surface of the crossbar, and a bottom leg for extending across the bottom surface of the crossbar, an L-shaped side-lock, opposing the C-shaped brace, having a horizontal leg for extending across the top surface of the crossbar and a vertical leg for extending down along a side surface of the crossbar, the horizontal leg being slidably and rotatably connected to the top leg of the C-shaped brace, so that the L-shaped side-lock may be pulled out to distance the vertical leg from the C-shaped brace and may be rotated to swing the vertical leg away from the bottom leg of the C-shaped brace for allowing insertion and removal of the crossbar into and out of the C-shaped brace, a cocking means for temporarily holding the L-shaped side-lock in the pulled out and swung away position, and a lock means for holding the vertical leg of the L-shaped side-lock against the crossbar to secure the side-lock clamp around the crossbar, the lock means comprising:

a biasing means for pulling the L-shaped side-lock toward the C-shaped brace to force the vertical leg against the side surface of the crossbar, and a latch means for holding the vertical leg of the L-shaped side-lock down along the second side surface of the crossbar, a roost guard attached to and upending from the side-lock clamps, for extending above and along the crossbar between the power lines for discouraging raptors from alighting and roosting on the crossbar between the power lines, and the roost guard having vertical outside edges for discouraging raptors from alighting and roosting on the roost guard.

12. A raptor protection unit as set forth in claim 11, wherein the two side-lock clamps face the same direction, and further comprising a bottom-lock clamp for receiving the crossbar and securing the raptor protection unit onto the crossbar, the bottom-lock clamp comprising:

- a top brace attached to and in between the two side-lock clamps, for extending across the top surface and down along the side surface of the crossbar on the same side as the C-shaped braces,
- an L-shaped bottom-lock having a vertical portion, for extending from the top brace toward the bottom surface of the crossbar, and a horizontal portion for extending across the bottom surface of the crossbar, the vertical portion being slidably attached to the top brace so that the L-shaped bottom-lock may be pulled down to distance the L-shaped bottom-lock from the top brace for allowing insertion and removal of the crossbar into and out of the bottom-lock clamp,
- a cocking means for temporarily holding the L-shaped bottom-lock in the pulled-down position, and
- a biasing means for pulling the L-shaped bottom-lock toward the top brace to force the horizontal portion against the bottom surface of the crossbar for securing the crossbar into the bottom-lock clamp.

13. A raptor protection unit as set forth in claim 12, wherein the L-shaped bottom-lock is a hollow tube having a 90° turn and wherein the biasing means comprises a coiled spring attached at one end to the top brace and extending through the interior of the hollow tube through the vertical portion, past the 90° turn, and into the horizontal portion and attached at the other end to the horizontal portion.

14. A raptor protection unit as set forth in claim 11, wherein the L-shaped side-lock is a hollow tube having a 90° turn and wherein the biasing means comprises a coiled spring attached at one end to the C-shaped brace and extending through the interior of the hollow tube through the horizontal leg, past the 90° turn, and into the vertical leg and attached at the other end to the vertical leg.

* * * * *